(12) United States Patent
Jeong

(10) Patent No.: US 8,200,911 B2
(45) Date of Patent: Jun. 12, 2012

(54) DEVICE HAVING SHARED MEMORY AND METHOD FOR CONTROLLING SHARED MEMORY

(75) Inventor: Jong-Sik Jeong, Seoul (KR)

(73) Assignee: MTekvision Co., Ltd., Seoul (KR)

( * ) Notice: Subject to any disclaimer, the term of this patent is extended or adjusted under 35 U.S.C. 154(b) by 778 days.

(21) Appl. No.: 12/307,049

(22) PCT Filed: Aug. 10, 2007

(86) PCT No.: PCT/KR2007/003853
§ 371 (c)(1),
(2), (4) Date: Dec. 30, 2008

(87) PCT Pub. No.: WO2008/018775
PCT Pub. Date: Feb. 14, 2008

(65) Prior Publication Data
US 2009/0204770 A1 Aug. 13, 2009

(30) Foreign Application Priority Data
Aug. 10, 2006 (KR) .................. 10-2006-0075693

(51) Int. Cl.
*G06F 12/00* (2006.01)
*G06F 13/00* (2006.01)
*G06F 13/28* (2006.01)

(52) U.S. Cl. ... 711/147; 711/149; 711/151; 711/E12.001
(58) Field of Classification Search .................. 711/147, 711/149, 151, E12.001
See application file for complete search history.

(56) References Cited

U.S. PATENT DOCUMENTS

| 6,718,443 | B2 * | 4/2004 | Yoshida | 711/147 |
|---|---|---|---|---|
| 2005/0021914 | A1 * | 1/2005 | Chung | 711/145 |
| 2005/0144369 | A1 * | 6/2005 | Jaspers | 711/105 |
| 2005/0144401 | A1 * | 6/2005 | Pantalone et al. | 711/151 |
| 2005/0193081 | A1 * | 9/2005 | Gruber et al. | 709/212 |
| 2008/0005417 | A1 * | 1/2008 | Lee et al. | 710/62 |

FOREIGN PATENT DOCUMENTS

| JP | 2-81255 A | 3/1990 |
|---|---|---|
| JP | 11-39214 A | 2/1999 |
| KR | 1996-0032190 A | 9/1996 |
| KR | 1999-0066122 A | 8/1999 |

* cited by examiner

*Primary Examiner* — Michael Alsip
(74) *Attorney, Agent, or Firm* — Birch, Stewart, Kolasch & Birch, LLP

(57) ABSTRACT

A device having a shared memory and a shared memory controlling method are disclosed. A digital processing device can include a shared memory, having a storage area including at least one common section, coupled to each of the processors through separate buses and outputting access information to whether a processor is accessing a common section. With the present invention, each processor can efficiently use or/and control a shared memory by using access information.

13 Claims, 7 Drawing Sheets

DEVICE HAVING SHARED MEMORY AND METHOD FOR CONTROLLING SHARED MEMORY

CROSS-REFERENCE TO RELATED APPLICATIONS

This application claims foreign priority benefits under 35 U.S.C. sctn. 119(a)-(d) to PCT/KR2007/003853, filed Aug. 10, 2007, which is hereby incorporated by reference in its entirety.

BACKGROUND

1. Technical Field

The present invention relates to a digital processing device, more specifically to a digital processing device having a shared memory shared by a plurality of processors.

2. Description of the Related Art

A portable terminal refers to a compact electronic device that is designed to be easily carried by a user in order to perform functions such as game or mobile communication. A portable terminal can be a mobile communication terminal, a personal digital assistant (PDA) or a portable multimedia player (PMP).

The mobile communication terminal is essentially a device designed to enable a mobile user to telecommunicate with a receiver who is remotely located. Thanks to scientific development, however, the latest mobile communication terminals have functions, such as camera and multimedia data playback, in addition to the basic functions, such as voice communication, short message service and address book.

FIG. 1 is s a block diagram illustrating a conventional mobile communication terminal having a camera function.

Referring to FIG. 1, the mobile communication terminal 100 having a camera function comprises a high frequency processing unit 110, an analog-to-digital converter 115, a digital-to-analog converter 120, a processing unit 125, a power supply 130, a key input 135, a main memory 140, a display 145, a camera 150, an image processing unit 155 and a support memory 160.

The high frequency processing unit 110 processes a high frequency signal, which is transmitted or received through an antenna.

The analog-to-digital converter 115 converts an analog signal, outputted from the high frequency processing unit 110, to a digital signal and sends to the processing unit 125.

The digital-to-analog converter 120 converts a digital signal, outputted from the processing unit 125, to an analog signal and sends to the high frequency processing unit 110.

The processing unit 125 controls the general operation of the mobile communication terminal 100. The processing unit 125 can include a central processing unit (CPU) or a microcontroller.

The power supply 130 supplies electric power required for operating the mobile communication terminal 100. The power supply 130 can include a port for being coupled to, for example, an external power source or a battery.

The key input 135 generates key data for, for example, setting various functions or dialing of the mobile communication terminal 100 and sends the key data to the processing unit 125. For example, the key input 135 can be realized as a key pad including a plurality of key buttons.

The main memory 140 stores an operating system and a variety of data of the mobile communication terminal 100. The main memory 140 can be, for example, a flash memory or an EEPROM (Electrically Erasable Programmable Read Only Memory).

The display 145 displays the operation status of the mobile communication terminal 100 and an external image photographed by the camera 150. For example, the display 145 can include a liquid crystal display (LCD) panel.

The camera 150 photographs an external image (a photographic subject) and generates and outputs an image signal corresponding to the photographed external image.

The image processing unit 155 processes the external image photographed by the camera 150. The image processing unit 155 can perform functions such as color interpolation, gamma correction, image quality correction and JPEG encoding. The camera 150 and the image processing unit 155 can be controlled by the processing unit 125.

The support memory 160 stores the external image processed by the image processing unit 155.

As described above, the mobile communication terminal 100 having a camera function is equipped with a plurality of processors (i.e. a main processor and one or more application processors for performing additional functions). For example, the mobile communication terminal 100, illustrated in FIG. 1, includes the processing unit 125 as a main processor for controlling general functions of the mobile communication terminal 100 and the image processing unit 155 as an application processor for controlling the camera function. Here, the image processing unit 155 is controlled by the processing unit 125. The processing unit 125 and the image processing unit 155 are embodied as a separate processor, respectively, and each processor is structured to be coupled to an independent memory.

The type of the application processor, which can be realized as a separate processor, respectively, and controlled by the main processor, can be varied depending on the additional function equipped in the portable terminal. For example, the application processor for controlling the camera function can process functions such as JPEG encoding and JPEG decoding; the application processor for controlling the movie file playback function can process functions such as video file (e.g., MPEG4, DIVX, H.264) encoding and decoding; and the application processor for controlling the music file playback function can process functions such as audio file encoding and decoding. Of course, there can be an application processor that can collectively process various aforementioned functions.

Each of these processors is individually coupled to a memory for storing the data processed by the processor. Accordingly, according to the conventional art, it is necessary to increase the number of processors and memories as portable terminals become increasingly multifunctional, which, as a result, causes to increase the external size of the portable terminal.

FIG. 2 is an example illustrating a coupling structure among a main processor, an application processor, their corresponding memories and a display device in accordance with the conventional art.

Referring to FIG. 2, a main processor 210 and an application processor 220 communicate information with each other (e.g., a command for controlling the application processor and data to be processed by the application processor 220) through a coupled bus.

A bus typically refers to a common-purpose electric pathway that is used to transmit information between the processor, the main memory and the input/output in a device such as a computer. The bus includes a line for data, designating the address of each device or the position of the memory, and a line for distinguishing a variety of data transmission operations to be processed. Hereinafter, the bus, which couples the main processor 210 to the application processor 220, is called an MP (main processor)-AP (application processor) bus.

The main processor 210 is coupled to the main memory 230 through a bus, which called an MP (main processor)-MM (main memory) bus, and the application processor 220 is coupled to the supplementary memory 240 through an independent bus, which is called an AP (application processor)-AM (application memory) bus.

The application processor 220, which is coupled to the display device 250, allows information corresponding to a command of the main processor 210, information transferred from the main processor 210 or data processed by the application processor 220, to be displayed through the display device 250. It is well-known to any persons of ordinary skill in the art that the display device 250 is able to be controlled by the main processor 210 or the application processor 220 according to types of information and/or to be supposed to be displayed.

As illustrated in FIG. 2, the processors 210 and 220 is independently coupled to the memories 230 and 240, respectively. Thus, according to the operation that is required to be currently performed, the main processor 210, for example, reads data stored in the main memory 230 and transmits the data to the application processor 220 through the host interface or reads data stored in the supplementary memory 240 by requiring the application processor 220.hy In other words, in case the main processor 210 and the application processor 220, respectively, processes data, the main processor 210 accesses the main memory 230 to read data and performs necessary processing of the read data. Then, the main processor 210 transmits the processed data to the application processor 220. The application processor 220 re-processes the received data and stores the data in the supplementary memory 240. Then, the application processor 220 transmits the data, stored in the supplementary memory 240, back to the main processor 210 so as to be stored in the main memory 230.

In this case, the larger the amount of data is received and transmitted between the main processor 210 and the application processor 220, the more time each of the processors 210 and 220 has to spend on the operation (i.e. memory accessing, data reading, host interface operation) required by the other processor rather than its original process.

For example, in the case of processing 3-D graphic data having large transmission amount and displaying the processed graphic data through the display device 250, the main processor 210 reads and processes the data, stored in the main memory 230, and then, transmits the processed data to the application processor 220 through the MP-AP bus. The application processor 220 stores the data (e.g., polygon data and texture data), received through the MP-AP bus in the supplementary memory 240, and then, reads and processes the stored data so as to display the data through the display 250.

In the case of processing the 3-D graphic data, there is naturally a large amount of data received and transmitted between the main processor 210 and the application processor 220, to thereby lead to the loss of the unnecessary time and the processing efficiency of each processor 210 and 220 in large data communication.

Beside that, a bottleneck is caused in data communication between the main processor 210 and the application processor 220 as the amount of data to be processed and the functions performed by the portable terminal increase.

As a result, the problems described above weaken the overall performance of a multi-function portable terminal.

SUMMARY

The present invention provides a digital processing device having a shared memory and a shared memory controlling method that can promptly offer access information (i.e. access status information or access requiring information) to the shared memory to each processor.

The present invention also provides a digital processing device having a shared memory and a shared memory controlling method that can allow each processor to efficiently use or/and control the shared memory by use of access information.

The present invention also provides a digital processing device having a shared memory and a shared memory controlling method that can minimize an access time to a common area (i.e. a storage area set to be accessed by a plurality of processors) by allowing final data (e.g. an operation result value), desired to be transferred from one of each processor to another processor, to be stored in the common area.

The present invention provides a digital processing device having a shared memory and a shared memory controlling method that can more quickly perform a data parallel processing by minimizing an access time to a common area by a processor.

The present invention provides a digital processing device having a shared memory and a shared memory controlling method that can simplify the control flow when a plurality of processors shares the shared memory.

The present invention provides a digital processing device having a shared memory and a shared memory controlling method that can increase the using efficiency of the shared memory by dividing a storage area of the shared memory into a plurality of sections (e.g., a dedicated section and a common section).

The present invention provides a digital processing device having a shared memory and a shared memory controlling method that can minimize a transmission time of data between each processor by allowing each processor to be able to access a common section of partitioned storage sections.

The present invention provides a digital processing device having a shared memory and a shared memory controlling method that can optimize the operation speed and efficiency of each processor because each processor is able to skip an additional process for transferring data by using a common section of the shared memory.

The present invention provides a digital processing device having a shared memory and a shared memory controlling method that can allow each processor to quickly process data through each of n common sections into which the shared memory is partitioned by generating and outputting access status information to the shared memory.

In addition, the present invention provides a digital processing device having a shared memory and a shared memory controlling method that can maximize a data transferring speed by allowing a main processor to successively write data in n partitioned common sections, n being a natural number, and the application processor to successively access and read the data which the main processor has written in the partitioned common sections.

Other problems that the present invention solves will become more apparent through the following description.

To solve the above problems, an aspect of the present invention features a digital processing device having a plurality of processors sharing one memory and/or a memory device shared by a plurality of processors.

According to an embodiment of the present invention, the digital processing device can include n processors, n being a natural number and the same as or larger than 2; and a shared memory, including a storage area including having at least one common section, coupled to the n processors through each separate bus, and outputting access information related to whether a processor is accessing a common section. Here, the common section can be the storage area for writing or reading an operation result value per processing unit of the data to be communicated between the plurality of processors.

The storage area can further include c dedicated sections, respectively, allotted to be permitted to be accessed by a predetermined processor, c being a natural number, and the common section can be the storage area that is accessible individually by k processors, k being a natural number and 2=k=n, during a non-identical period of time.

At least one of basic data for computing the operation result value per processing unit and an operation intermediate value can be written in the dedicated section.

The access information can be inputted and outputted through an interrupt pin. The number of the interrupt pins can be identical to that of the common sections The access information inputted into a processor can be outputted as a first type signal if another processor is accessing or attempts to access the common section and outputted as a second type signal if another processor does not access the common section.

While the first type signal is inputted, the processor which has transmitted an access request to the shared memory can re-transmit the access request to the shared memory after the access information, renewed into the second type signal, is inputted.

Each processor can input an access request including at least one of address information and a control signal into the shared memory in order to access the shared memory.

The control signal can include an address signal, directing to the common section, and a chip select signal of a common memory device.

The address signal can include a bank address pointing to a common section.

The control signal can include a mode register set (MRS) signal and a chip select signal of a common memory device.

The shared memory can generate and output the access status information by referring to a value written in a predetermined section by a processor, in order that the processor accesses the common section.

The n processors can be configured to comprise a main processor; and n-1 application processors, coupled to the main processor through each separate bus and performing an operation according to a control signal inputted through the control bus.

The application processor can read and write in the corresponding dedicated section the operation result value, written in the common area by the main processor, and then processes the written operation result value according to the control signal.

The shared memory can include the storage area; n access ports corresponding to the processors, respectively; and an internal controller, generating and outputting to the corresponding processor access information related to whether a processor is accessing or attempts to access the common section.

According to another embodiment of the present invention, the memory device shared by a plurality of processors can include n access ports, coupled corresponding to n processors, n being a natural number and the same as or larger than 2; a storage area, having at least one common section which is allotted to be accessible individually by k processors, k being a natural number and 2=k=n, during a non-identical period of time; and an internal controller, generating and outputting to the corresponding processor access information related to whether a processor is accessing or attempts to access the common section. Here, the common section can be the storage area for writing or reading an operation result value per processing unit of the data to be communicated between the plurality of processors.

The storage area can further include at least one dedicated section, respectively, that is allotted to be permitted to be accessed by a predetermined processor.

At least one of basic data for computing the operation result value per processing unit and an operation intermediate value can be written in the dedicated section.

The access information can be inputted and outputted through an interrupt pin. The number of the interrupt pins can be identical to that of the common sections.

To solve the above problems, another aspect of the present invention features a shared memory controlling method and/or a recording medium recorded with a program for executing the method.

According to an embodiment of the present invention, the method of providing access status information by a shared memory shared by a plurality of processors can include outputting corresponding access information to a second processor if an access request is inputted from a first processor; permitting the first processor to access the common section if the second processor does not access the common section; and permitting the first processor to access the common section if the access request is received again from the first processor after the second processor ends the access to the common section when the second processor has still been accessing the common section.

The common section, which is the storage area that is accessible individually by a plurality of processors during a non-identical period of time, can be the storage area for writing or reading an operation result value per processing unit of the data to be communicated between the plurality of processors.

The access information can be inputted and outputted through an interrupt pin. The number of the interrupt pins can be identical to that of the common sections According to another embodiment of the present invention, there is provided a recording medium tangibly embodying a program of instructions executable by a memory device to perform a method of allowing a shared memory to provide access status information, the recording medium being readable by the digital processing apparatus, the program including outputting corresponding access information to a second processor if an access request is inputted from a first processor; permitting the first processor to access the common section if the second processor does not access the common section; and permitting the first processor to access the common section if the access request is received again from the first processor after the second processor ends the access to the common section when the second processor has still been accessing the common section.

DETAILED DESCRIPTION

Figure 1:
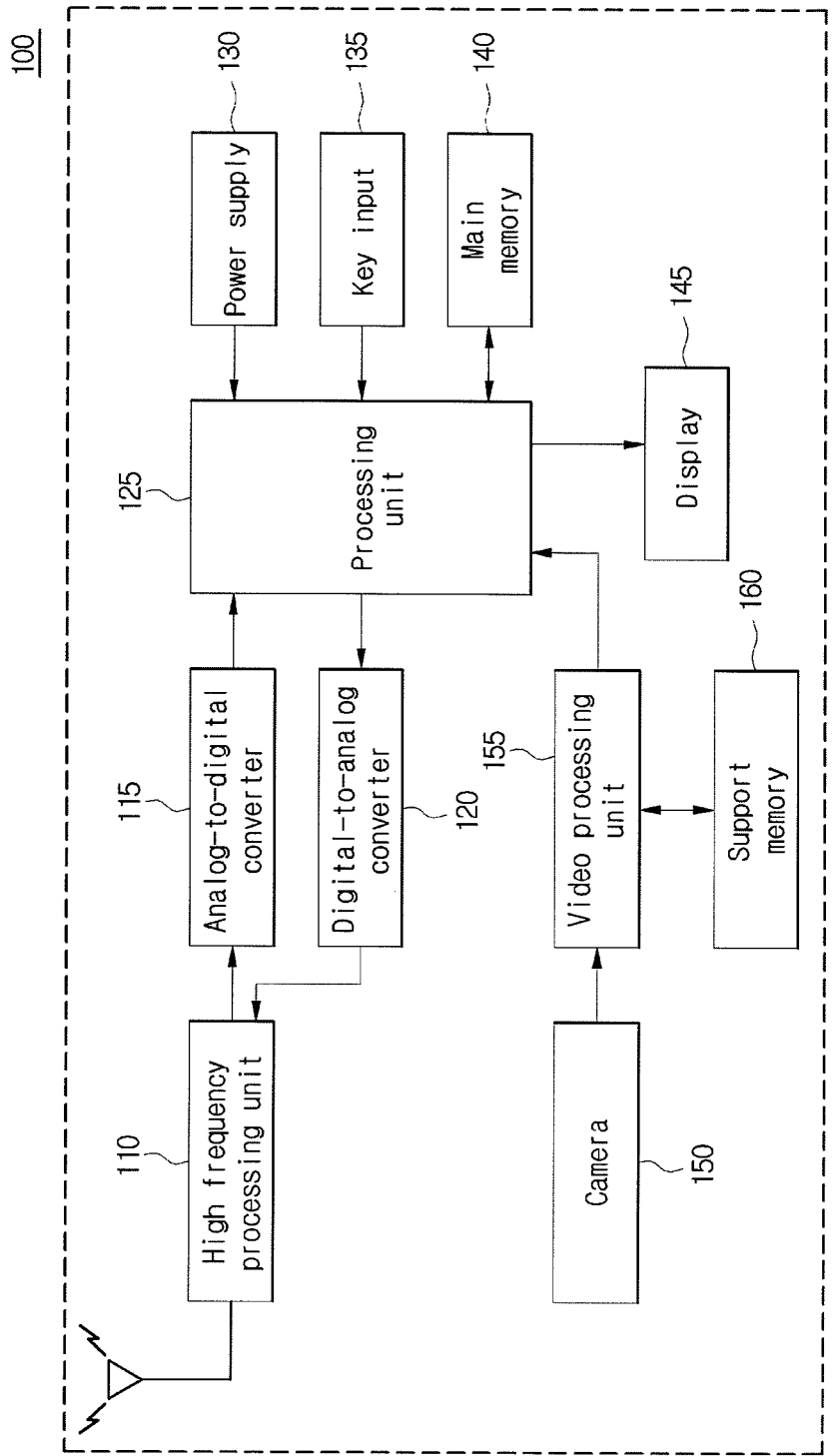
FIG. 1 is s a block diagram illustrating a conventional mobile communication terminal having a camera function.
Figure 2:
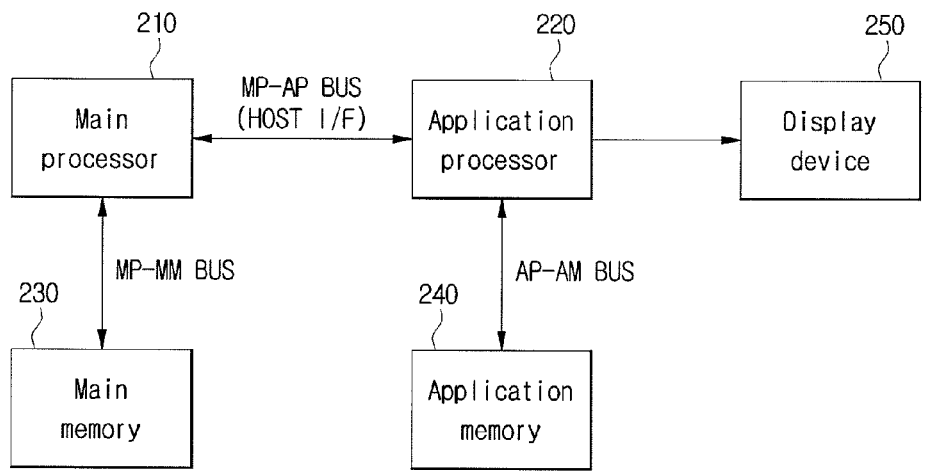
FIG. 2 is an example illustrating a coupling structure among a main processor, an application processor, their corresponding memories and a display device in accordance with the conventional art.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

In this description, a shared memory provides information related to whether any one processor is currently accessing a common section to at least one processor, in order to control a plurality of processors not to attempt to access the common section. The shared memory also controls a processor, which is currently accessing a common section, to promptly release the access by transferring the information related to whether any one processor is currently accessing a common section, to the processor.

Figure 3:
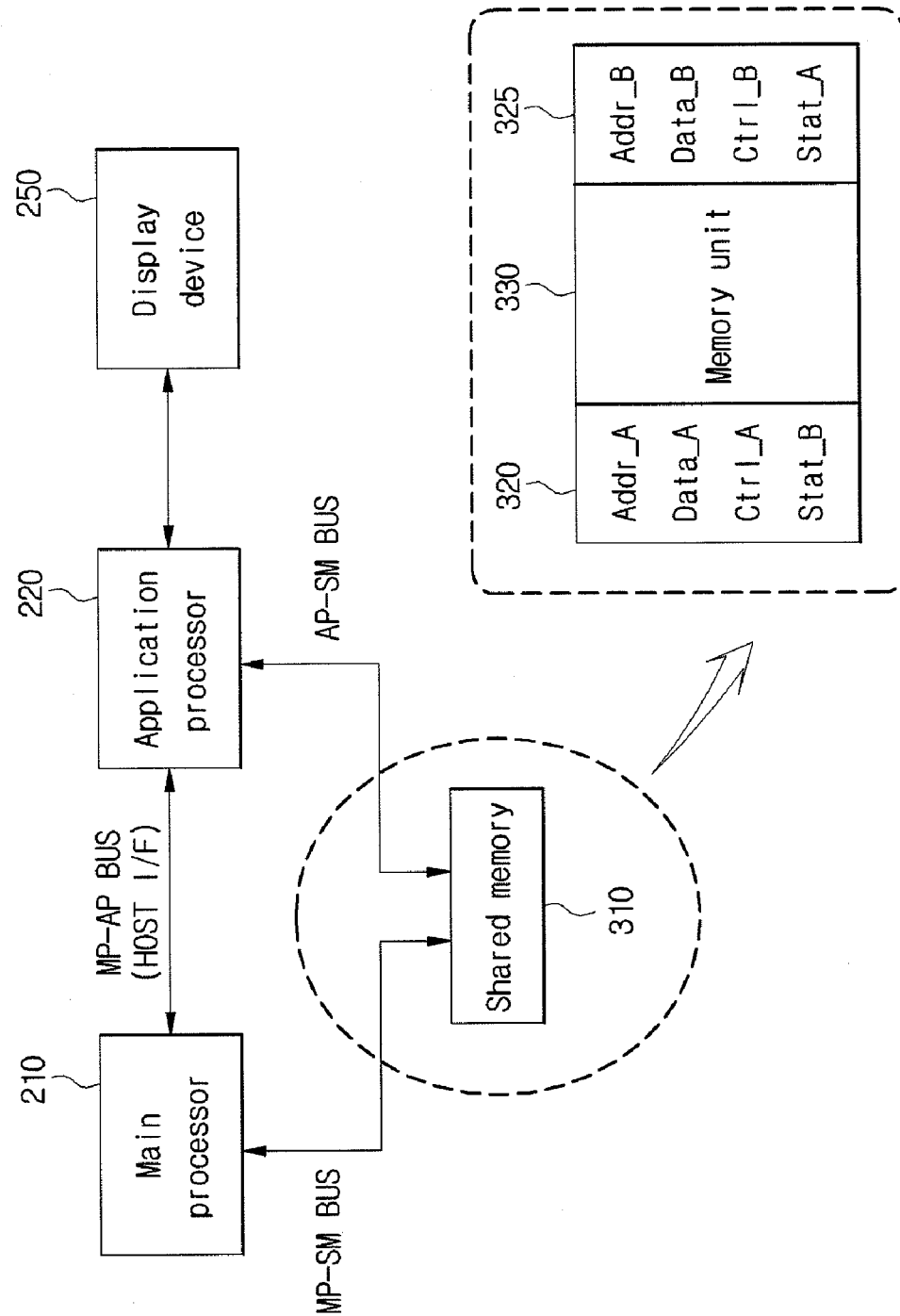
FIG. 3 illustrates a coupling structure between a main processor, an application processor, a shared memory and a display device in accordance with an embodiment of the present invention.
Figure 4:
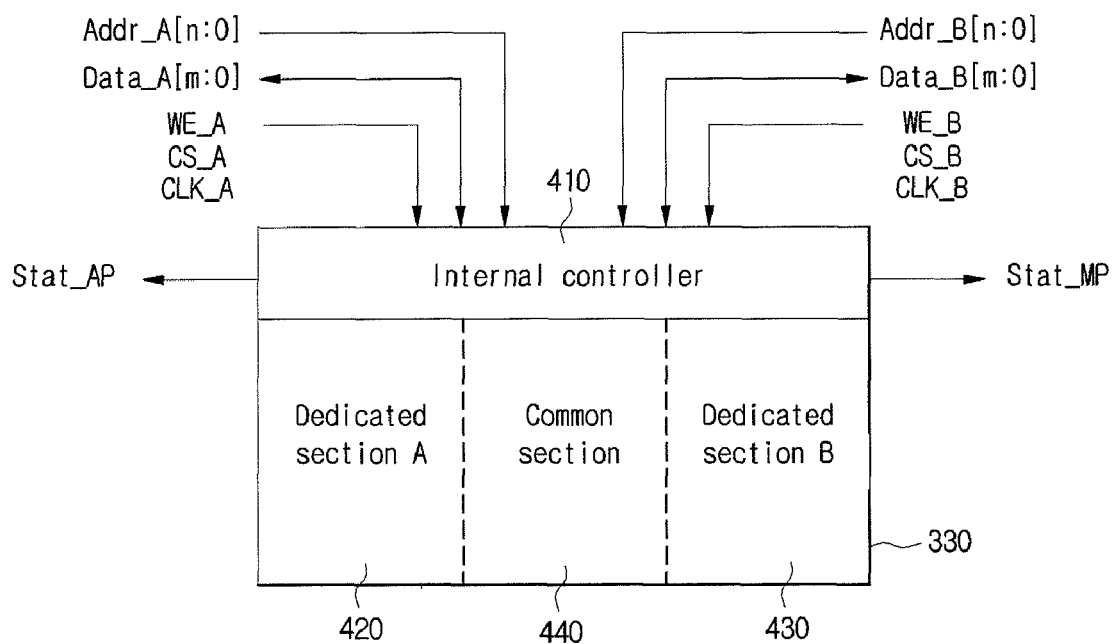
FIG. 4 and FIG. 5 illustrate the structure of a memory unit in accordance with an embodiment of the present invention.
Figure 5:
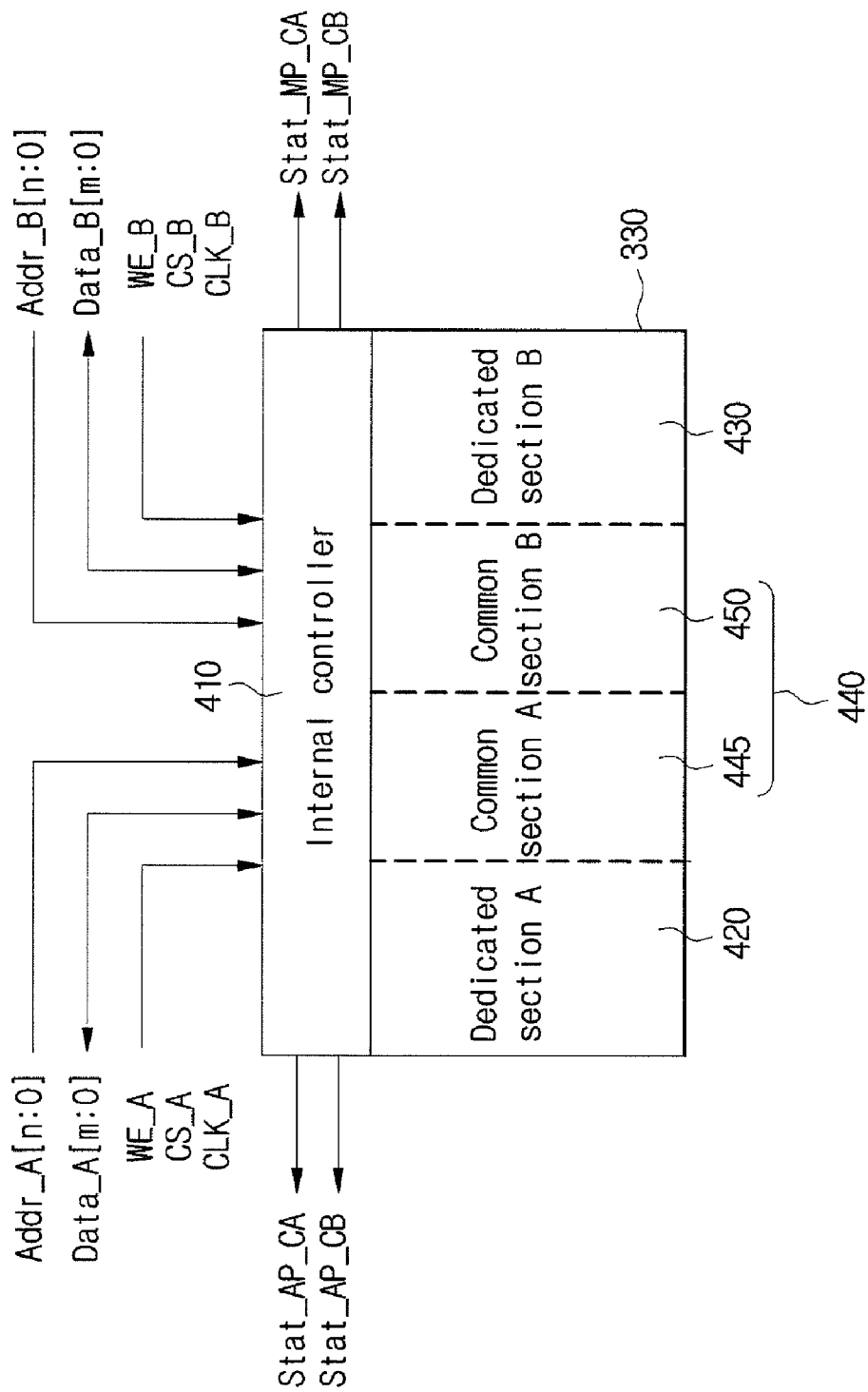

FIG. 3 illustrates a coupling structure between a main processor, an application processor, a shared memory and a display device in accordance with an embodiment of the present invention, and FIG. 4 and FIG. 5 illustrate the structure of a memory unit in accordance with an embodiment of the present invention.

As illustrated in FIG. 3, a main processor 210 and an application processor 220 in the digital processing device of the present invention can be coupled to each other in a form of the structure sharing one shared memory 310.

Behind the application processor 220 is coupled the display device 250, which is directly controlled by the main processor 210 or is controlled by the application processor 220 according to a processing command of the main processor 210. The main processor 210 can output a control command, for controlling the display device 250 or the application device 220, through the MP-AP bus. Although FIG. 3 illustrates the display device 250 only as an output device, which is coupled behind the application processor 220, various output devices can be coupled depending on the function of the application processor 220.

Even though FIG. 3 illustrates only one application processor 220, it shall be obvious that the number of the application processors or a corresponding processing operation depend on functions equipped by the digital processing device. Also, FIG. 3 illustrates that one shared memory 310 is shared by the plurality of processors 210 and 220. However, the number of the shared memory 310 can be increased or decreased as necessary, and also, different processors can share each shared memory. For example, a first shared memory can be shared by the main processor and a first application processor, a second shared memory can be shared by the main processor and a second application processor or a third shared memory can be the first application processor and the second application processor.

Referring to FIG. 3, the main processor 210 and the application processor 220 can transmit or receive information (e.g. a driving start command/driving end command of the display device 250, a processing command, directing to process data written in the shared memory 310 or status information) through the MP-AP bus.

The main processor 210, which is coupled to the shared memory 310 through an MP-SM (shared memory) bus, writes data (e.g. a display parameter) in a specific storage area of the shared memory 310 or reads the data written in the pertinent storage area. Here, the main processor 210 can be a processor controlling a general operation of the digital processing device (e.g. a portable terminal) and an operation of the application processor 220. The display parameter can be information related to coordinates, decomposed into triangles necessary to display one picture and types of colors and effects given to a surface of the corresponding triangle.

Although FIG. 3 illustrates the shared memory 310 only as all memories that are coupled to the main processor 210, it shall be obvious that another memory can be additionally coupled to the main processor 210. For example, a nonvolatile memory storing a boot code can be further coupled to the main memory 210.

The application processor 220, which is coupled to the shared memory 310 through an AP-SM bus, writes data in a specific storage area of the shared memory 310 or reads the data written in the pertinent storage area.

The application processor 220 can be a processor dedicated for processing MPEG-4, 3-D graphic, camera and MP3 file playback by the control of the main processor 210.

In this case, if the application processor 220 receives a processing command (e.g. a command for processing data written in an address and directing to a processing type) from the main processor 210 through the MP-AP bus, the application processor 220 accesses the shared memory 310 through the AP-SM bus and reads the data (i.e. the data written by the main processor 210) written in the a pertinent storage area of the shared memory 310. Here, since the main processor 210 is to store the pertinent data in a common section 440 (refer to FIG. 4), the main processor 210 must access a pertinent area prior to the application processor 220 in order that the application processor 220 can access the area.

As described below with reference to pertinent drawings, the application processor 220 can transmit access requiring information to the shared memory 310 in order to access the common section 440 and can recognize access information inputted from the shared memory before ending the access to the common section 440.

The memory unit 310, which is structured to be shared by a plurality of coupled processors (i.e. the main processor and at least one application processor), has as many access ports as the number of equipped processors or processors sharing the memory unit 330.

If it is assumed that the shared memory 310 is shared by one main processor 210 and one application processor 220, the shared memory 310, as illustrated in FIG. 3, is mounted with two accesses ports 320 and 325. In other words, the main processor 210 can access the memory unit 330 through the MP-SM bus and one access port 320, and the application processor 220 can access the memory unit 330 through the AP-SM bus and another access port 325. Hereinafter, the access port 320 corresponding to the main processor 210 will be refers to as a first access port, and the access port 325 corresponding to the application processor 220 will be referred to as a second access port.

Each access port can further have n pins, for transmitting and receiving an address signal between corresponding processors, m pins, for transmitting and receiving a data signal, k pins, for transmitting and receiving a control signal and h pins, for transmitting and receiving access information (i.e. access status information or/and access requiring information) to a common section. Here, n, m, k and h are natural numbers, respectively.

As illustrated in FIG. 4 and FIG. 5, the memory unit 330 includes an internal controller 410 and a storage area that can be partitioned into a plurality of sections for allotment. The internal controller 410 is coupled to the main processor 210 and the application processor 220 through the first access port 320 and the second access port 325, respectively. The internal controller 410 can use the same or independent clock for each processor 210 and 220.

As examped in FIG. 4 and FIG. 5, the storage area of the memory unit 330 can be partitioned into a plurality of sections, that is, from 4 sections at a minimum to j sections at a maximum, j being a natural number. For example, the partitioned sections can include dedicated sections 420 and 430, individually allotted to the equipped processors, respectively, and at least one common section 440. Here, the dedicated sections 420 and 430 refer to the sections that can be exclusively accessed by a processor predetermined corresponding to the pertinent partitioned section (e.g. a dedicated section A 420 can be exclusively accessed by the main processor 210). The common section 440 refers to the section that can be individually accessed by all coupled processors at the non-identical time (e.g. a common section A 445 can be accessed by the application processor 220 at the time when the main processor 210 is not currently accessing the common section A 445). This is to allow each processor to individually access the corresponding portioned sections (i.e. the dedicated sections and the common section) through its separate path in order to perform a necessary operation (e.g. data writing or data reading).

First, the structure of the shared memory and the shared memory access information providing method will be briefly described with reference to FIG. 4.

If it is assumed that the shared memory 310 is controlled by two processors, the storage area of the memory unit 330, as illustrated in FIG. 4, can be partitioned into 2 dedicated sections (i.e. the dedicated section A 420 and the dedicated section B 430) and the common sections 440. Of course, it is obvious that a plurality of dedicated sections can be allotted to each processor and the common section can be partitioned into a plurality of subsections.

In case that the shared memory 310 is a SDRAM, for example, the purpose of the storage area can be set in units of each bank for the convenience. For example, 256 M bit SDRAM is set in units of 8 Mb×8 bits×4 banks. The pertinent banks, respectively, can be allotted to the dedicated section A 420, the dedicated section B 430, a common section A 445 and a common section B 450 (referring to FIG. 5). Of course, each partitioned section can be allotted not in units of the bank but according to a predetermined partition standard (e.g. address range appointment).

The main processor 210 can use the allotted dedicated section A 420 as the storage area for computing an operation result value to be transferred to the application processor 220. For example, if the main processor 210 attempts to transfer data to be outputted through the display device 250 to the application processor 220, the main processor 210 performs a necessary operation by using data stored in the dedicated area A 420 or a storage device, and then, stores the operation result value in the common section 440. Operation intermediate values generated in the computation of the operation result value can be written in the dedicated section A 420.

The operation result value can be a display parameter, for example. The display parameter can be information related to coordinates, decomposed into triangles in a quantity necessary to display one picture, and types of colors and effects, given to a surface of the corresponding triangle. When processing one frame (i.e. one picture), the main processor 210 decomposes the frame into a few to tens of processing units and computes the operation result value per processing unit before writing the computed operation result value in the common section 440. This is because it is possible to acquire an enough parallel processing time between each processor as compared with the conventional method that completes all computations for one frame and writes the operation result value in the common section 440, and thus, allows the application processor 220 to read and process the operation result value. Obviously, the data processing unit of the main processor 210 can be predetermined by a method such as section partitioning of frame. Of course, the method of computing and writing an operation result value can be commonly applied to any processor necessary to transfer data to another processor.

The application processor 220, which has been directed by the main processor to output the data written in the common section 440, accesses the common section 440 and reads and writes in the dedicated section B 430 the stored operation result value, and then, performs the processing for outputting the operation result value through the display device 250. The application processor 220 can receive a processing command from the man processor 210 through the MP-AP bus at a point of time (e.g. any one of before or after the main processor 210 starts to compute the operation result value in a first processing unit, and when at least one operation result value is written in the common section 440).

As described above, while the main processor 210 stores the operation result value per each processing unit in the common section 440 and the application processor 220 reads the operation result value at a point of time, if one of the processors 210 and 220 requires to access the common section 440, the shared memory 310 can output access information related to whether another processor 210 or 220 has already been accessing the common section 440. Further, the shared memory 310 can output access requiring information indicating the access attempt of another processor to the processor that has already been accessing the common section 440.

Below is described the method of providing access status information by the memory unit 330.

When the memory unit 330 provides access status information to each partitioned section, it is not necessary that the access status information to dedicated sections 420 and 430 is provided to each processor 210 and 220. This is because a processor, which is permitted to access each dedicated section 420 and 430, is predetermined and the corresponding processor has already known whether to access the pertinent dedication section for itself.

Accordingly, it is sufficient that the memory unit 330 provides access status information to the common sections A and B 445 and 450 to each processor or another processor (i.e. the processor that is not currently accessing the common sections). This is because each processor is restricted so as to be able to access the common section 440, only when another processor is not accessing the common section 440. Also, it is to make it possible to efficiently perform a parallel processing that after promptly completing to store an operation result value performed by the processor which has already been accessing the common section 440, the following computation of the operation result value per processing unit is allowed to be performed after ending the access of the processor to the common section 440.

In case that one processor (e.g. assumed to be the main processor 210) is accessing the common section 440, the memory unit 330 outputs access information for notifying this to another processor (e.g. assumed to be the application processor 220). The access information is inputted through an interrupt pin of the pertinent processor.

If an access requiring command to the common section 440 is inputted from any one processor, the access information can be outputted by the control of the internal controller 410. The access information can be outputted in a form of a high or low signal according to whether to be accessing or to be required to access the pertinent section. For example, the high signal can be set to indicate the status where the pertinent common section has already been accessed or required to be accessed by another processor, and the low signal can be set to indicate the status where the pertinent common section is accessible.

FIG. 5 illustrates the assumption that the common section 440 is partitioned into a common section A 445 and a common section B 450. It is obvious that the number of pins can be adjusted according to the increase or decrease of partitioned sections in the common sections 440. In the case of partitioning the common section 440 into a plurality of sections, when a first processor writes the operation result value in the common section 440, the first processor writes the operation result value alternately in the common section A 445 and the common section B 450. Also, when a second processor reads the operation result value written in the common section 440, the second processor alternately accesses the common section A 445 and the common section B 450 in the same order as the first processor to read the operation result value. This can cause a standby time of the second processor, which must wait for the end of accessing the common section by the first processor, to be minimized.

Hereinafter, the method of providing access status information by the memory unit 330 will be described with reference with FIG. 5.

For the convenience of description, it is assumed that the main processor 210 writes data in the common section A 445.

If the data, written in the common section A 445 by the main processor 210, is to be processed by the application processor 220, the main processor will transmit a processing command (e.g. a command for processing data written by an address and directing to a processing type) to the application processor 220 through an MP-AP bud at a point of time (e.g. when starting to access the common section A 445, when starting to write data, or directly before or after ending to access the common section A 445), after completing to write the data. The application processor 220 accesses the shared memory 310 through an AP-SM bus according to the processing command and reads and processes data (i.e. data written by the main processor 210) written in the pertinent storage area of the shared memory 310.

Through the below description, it is easily understood that the main processor 210 attempts to access another common section or the application processor 220 attempts to access any common section.

In case that the main processor 210 accesses the common section A 445 of the memory unit 330 and writes data (e.g. an operation result value per processing unit), the main processor 210 transmits a accessing request to the common section A 445 to the internal controller 410 through the first access port 320 of the shared memory 310.

Here, the access request can be performed by writing a predetermined value at a register predetermined in a specific section of the storage area or the internal controller 410, transmitting an address signal to the internal controller 410 or transmitting an address signal and a control signal together. The address signal can be specific address information (Add_A), provided in the common section A 445, for writing data. Also, the control signal can be, for example, at least one of a write enable (WE_A), for directing to writing data in the common section A, a chip select_A (SC_A), for chip selecting in the common section A, and a clock (CLK_A).

The internal controller 410 can recognizes that the main processor 210 attempts to access the common section A 445 through request information.

If the request information is a predetermined value written in the predetermined register, the internal controller 410 can recognize whether the main processor 210 attempts to access the common section A 445 by checking whether the pertinent value is written in the corresponding register. The register can be predetermined for each processor. For example, if the register is predetermined for each processor, the corresponding processor can write '1' in the register to attempt the access and write '0' in the register after ending the access.

If the request information is the address signal, the internal controller 410 can recognize whether the main processor 210 attempts to access the common section A 445 by using the inputted address signal. Similarly, in case that the request information consists of the address signal and the control signal, the internal controller 410 can recognize whether the main processor 210 attempts to access the common section A 445 by the same way. However, if the request information further includes the control signal, the internal controller 410 can additionally recognize what operation the main processor 210 attempts to perform through the access to the common section A 445.

If the memory unit 330 recognizes that the main processor 210 attempts to access the common section A 445 by using the inputted address signal, the memory unit 330 checks whether the application processor 220 has already been accessing the common section A 445 and output corresponding access status information (Start_AP_CA) through the interrupt pin. Of course, it is obvious that the access information outputted through the interrupt pin can be set so as to sustainedly be outputted and can be outputted in a form of a high or low signal according to whether a processor is accessing the pertinent common section.

Since this can be applied to not only the common section B 450 but also the case that the application processor 220 attempts to a common section, each pertinent description will be omitted.

In another embodiment, a mode set register (MRS) signal according to the joint electron device engineering council (JEDEC) standard can be employed as a signal for memory access instead of the address signal. In other words, by using a specific bit of the MRS signal as means for asking an access status of the shared memory, the MRS signal can be transferred to the internal controller 410 along with a chip selecting signal. In this case, the MRS signal can be transmitted to the internal controller 410 through a bus for receiving and transmitting the control signal or through a separate pin.

Figure 6:
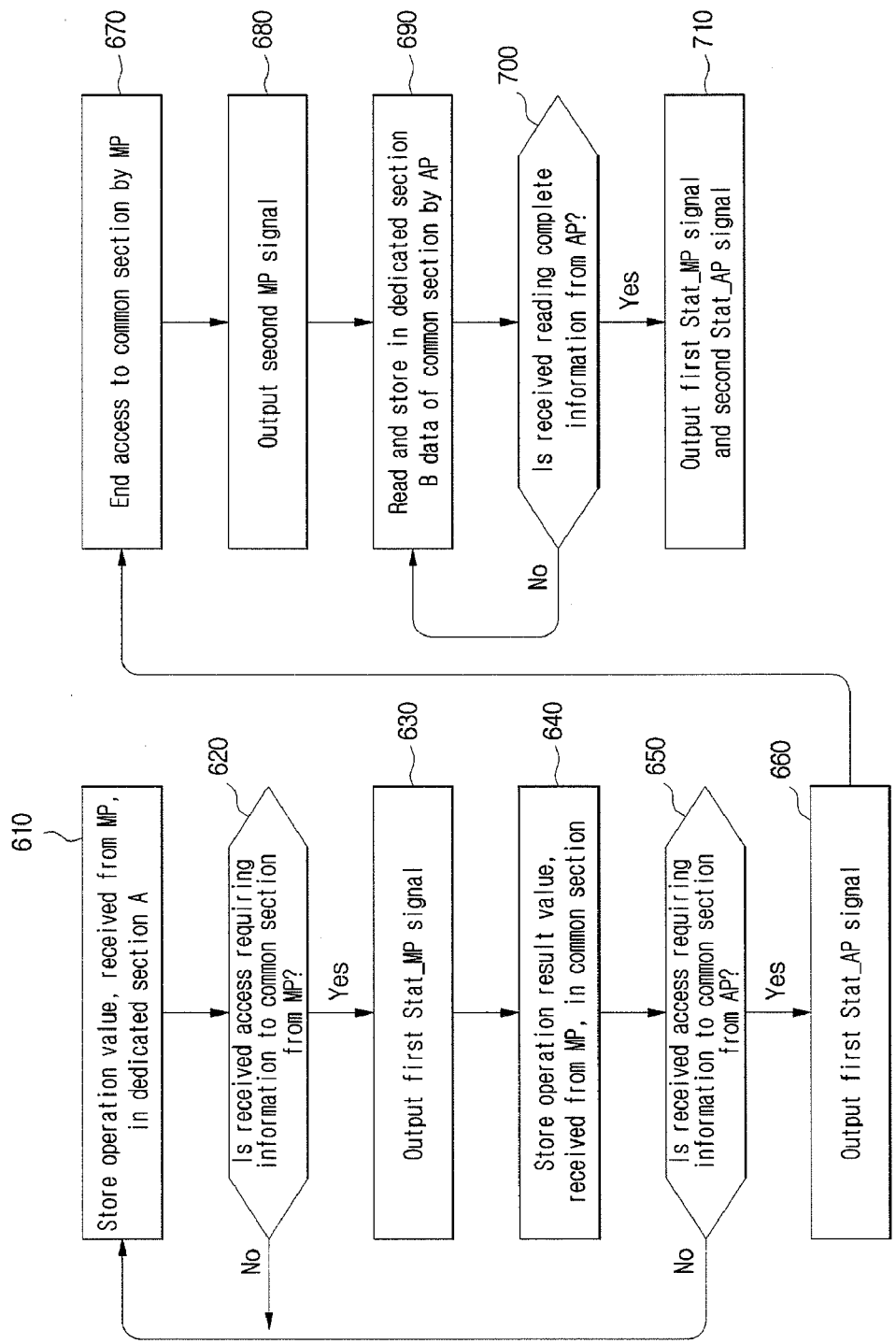
FIG. 6 is a flow chart illustrating a method of transmitting a computation result value between each processor in accordance with an embodiment of the present invention.
Figure 7:
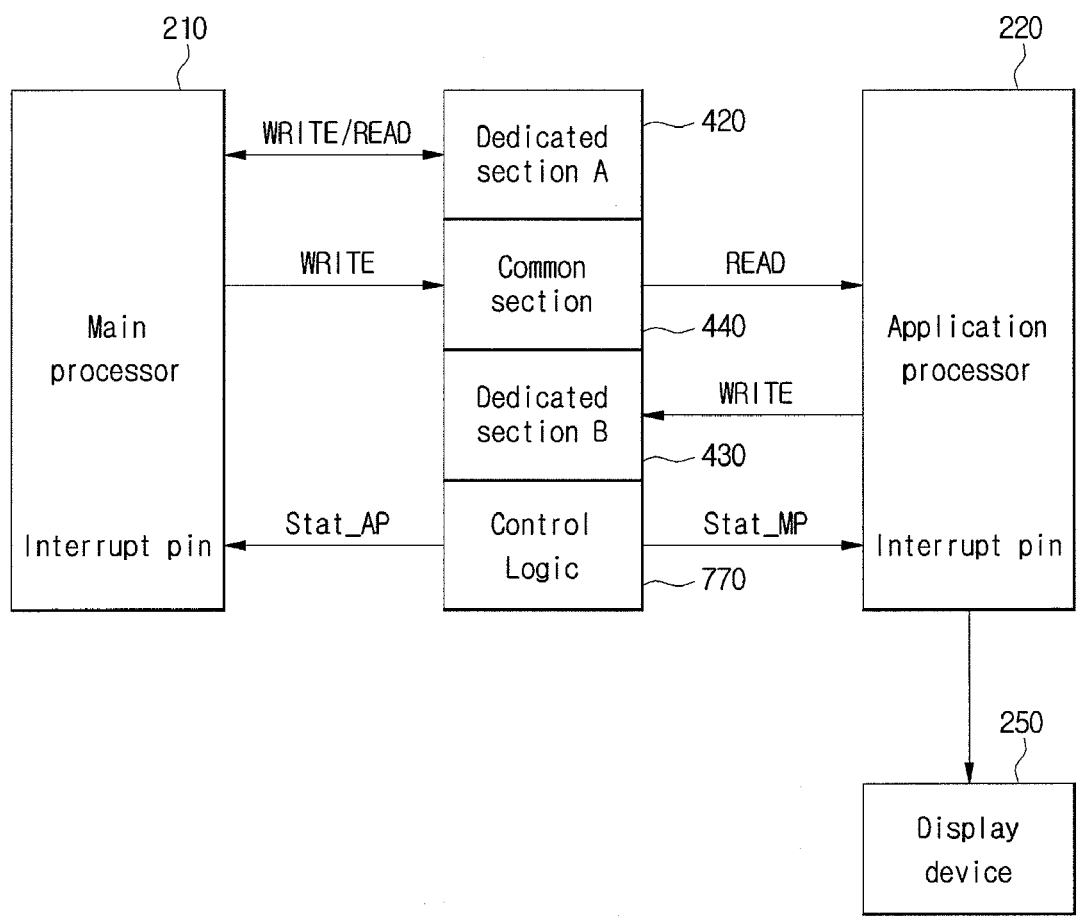
FIG. 7 is a conceptual diagram illustrating a method of transmitting a computation result value between each processor in accordance with an embodiment of the present invention.

FIG. 6 is a flow chart illustrating a method of transmitting a computation result value between each processor in accordance with an embodiment of the present invention, and FIG. 7 is a conceptual diagram illustrating a method of transmitting a computation result value between each processor in accordance with an embodiment of the present invention.

For the convenience of description, the below description assumes the operation that the main processor 210 computes an operation result value for displaying data through the display device 250 and transmits the operation result value to the application processor 220. Also, the below description assumes that the common section 440 is structured as one body and has yet been accessed by no processor. Through the below description, any person of ordinary skill in the art is able to easily understand that the same technical sprit can be applied to the case that the application processor 220 or the main processor 210 transfers data to the main processor 210 or the application processor 220.

Referring to FIG. 6, a step represented by 610 stores an operation value (e.g. at least one of an operation intermediate value and an operation result value), received from the main processor 210, in the dedicated section A 420. The main processor 210 can transmit an address signal and a control signal as well as the operation value (i.e. a data signal) to the memory unit 330.

In a step represented by 620, the memory unit 330 determines whether to receive access requiring information to the common section 440 from the main processor 210 in order to store the operation result value. Here, the access requiring information can be a predetermined value written in the internal controller 410 or a predetermined register of a certain section of a storage area by the main processor 210. Alternatively, the main processor 210 can transmit an access request including an address signal and a control signal to the internal controller 410.

If the access requiring information is received, in a step represented by 630, the memory unit 330 outputs access information (i.e. a first Stat_MP signal) to the common section 440 to the application processor 220. The access information outputted in the step represented by 630, which is information indicating that the main processor 210 attempts to access the common section 440, can be access information of a high state (or access information of a low state that can be set according to a design type), for example. Since an initial state, as described above, is assumed to be the state where the common section 440 has yet been accessed by no processor, the access information to the application processor 220 will be the access information of the low state (e.g. a second Stat_AP signal) and the main processor 210 will be permitted to access the common section 440.

In a step represented by 640, the memory unit 330 stores the operation result value, received from the main processor 210, in the common section 440. The address in the common section 440 where the operation result value is stored can be determined by the address signal received from the main processor 210, for example.

In a step represented by 650, the memory unit 330 determines whether to receive the access request to the common section 440 from the application processor 220. The application processor 220 will attempt to the common section 440 by a processing command (i.e. a control command, for allowing data according to operation result values, written in the common section 440, to be outputted through the display device 250) received from the main processor 210 through an MP-AP bus. The main processor 210 can transmit a processing command to the application processor 220 at a point of time (e.g. any one of before or after the main processor 210 starts to compute the operation result value in a first processing unit, and when at least one operation result value is written in the common section 440).

If the access requiring information is not received from the application processor 220, the method returns to the step represented by 610 in order to allow the following operation result value of the processing unit or the operation result value per processing unit of a new frame to be stored in the common section 440. In this case, when the main processor 210 stores the computed operation result value in the common section 440 and then accesses the dedicated section A 420 to compute the operation result value of a new processing unit, if the main processor 210 ends the access to the common section 440, the method can further include the step of outputting the access information of the low state (i.e. the second Stat_MP signal) to the application processor 220, which is not shown.

Also, if the access requiring information is received from the application processor 220, in a step represented by 660, the memory unit 330 outputs the access information of the high state to the application processor 220 (i.e. the first Stat_AP signal) to the main processor 210. The main processor 210 can recognize that the application processor 220 is attempting to access the common section 440 by the first Stat_AP signal.

In a step represented by 670, the memory unit 330 receives an access end request to the common section 440 (or an access request to the dedicated section A 420) from the main processor 210 and performs a corresponding processing. In other words, if the main processor 210 has completed to write the already-computed operation result value per processing unit in the common section 440 with reference to the first Stat_AP signal, the main processor 210 immediately ends the access to the common section 440. If the main processor 210 has still been writing the operation result value, the main processor 210 promptly completes to write the operation result value and then ends the access to the common section 440.

In a step represented by 680, since the main processor 210 has ended the access to the common section 440, the memory unit 330 outputs the access information of the low state (i.e. the second Stat_MP signal) to the main processor 210 to the application processor 220.

In a step represented by 690, the application processor 220 reads the operation result value per processing unit, written in the common section 440, and writes the operation result value in the dedicated B 430.

In a step represented by 700, the memory unit 330 determines whether to receive reading complete information from the application processor 220 by completing to read the operation value per processing unit, written in the common section 440.

If the reading complete information is received, in a step represented by 710, the memory unit 330 outputs the access information of the high state (i.e. the first Stat_MP signal) to the main processor 210 to the application processor 220 such that the operation result value per processing unit, computed subsequently by the main processor 210, can be written in the common section 440. The memory unit 330 also outputs the access information of the low state to the application processor 220 (i.e. the second Stat_AP) to the main processor 210.

The foregoing series of operations are conceptually illustrated in FIG. 7.

The main processor 210 performs the processing in the state where the main processor 210 is accessing the dedicated section A 420 until an operation result value is computed per processing unit. Then, if the operation result value is computed, the main processor 210 writes the computed operation result value in the common section 440. If the main processor 210 is accessing the common section 440, the access information indicating this is provided to the application processor 220 through an interrupt pin.

Similarly, the application processor 220 accesses the common section 440 and reads and writes in the dedicated section B 430 the written operation result value. Then, the application processor 220 performs an operation (e.g. an outputting operation through the display device 250) corresponding to the processing command received from the main processor 210. The application processor 220 maintains the state where the application processor 220 is accessing the common section 440 until all operation result values written in the common section 440 are read. If the application processor 220 is accessing the common section 440, the access information indicating this is provided to the main processor 210 through an interrupt pin.

As described above, a shared memory controlling method can be also realized as a code that is readable by a computer in a recording medium that is readable by the computer. The recording medium, which is readable by the computer, includes all kinds of recoded media storing data readable by a computer system. The recording medium readable by the computer includes, for example, not only ROM, RAM, CD-ROM, magnetic tape, floppy disc and optical data storing device but also means realized in a form of carrier wave (e.g. the transmission through Internet). Also, the recording medium readable by the computer can be distributed to the computer system, connected by a network, and store and execute the code readable by the computer by a distributing method. A functional program, code and code segment for embodying the method of providing access status information by the shared memory can be inferred by a programmer in the technical field to which the invention pertains.

As described above, the present invention can promptly offer access information (i.e. access status information or access requiring information) to a shared memory to each processor.

The present invention can also allow each processor to efficiently use or/and control a shared memory by use of access information.

The present invention can also minimize an access time to a common area (i.e. a storage area set to be accessed by a plurality of processors) by allowing final data (e.g. an operation result value), desired to be transferred from one of each processor to another processor, to be stored in the common area.

The present invention can more quickly perform a data parallel processing by minimizing an access time to a common area by a processor.

The present invention can simplify the control flow when a plurality of processors shares a shared memory.

The present invention can increase the using efficiency of a shared memory by dividing a storage area of the shared memory into a plurality of sections (e.g., a dedicated section and a common section).

The present invention can minimize a transmission time of data between each processor by allowing each processor to be able to access a common section of partitioned storage sections.

The present invention can optimize the operation speed and efficiency of each processor because each processor is able to skip an additional process for transferring data by using a common section of a shared memory.

The present invention can allow each processor to quickly process data through each of n common sections into which a shared memory is partitioned by generating and outputting access status information to the shared memory.

In addition, the present invention can maximize a data transferring speed by allowing a main processor to successively write data in n partitioned common sections, n being a natural number, and the application processor to successively access and read the data which the main processor has written in the partitioned common sections.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A digital processing device, comprising:
   n processors, n being a natural number and the same as or larger than 2, wherein the n processors include a main processor and n-1 application processors coupled to the main processor through each separate bus and perform an operation according to a control signal inputted through a control bus; and
   a shared memory including a storage area having at least one common section coupled to the main processor and the n-1 application processors through each separate bus, and outputting access information related to whether at least one of the n processors is accessing the at least one common section, n access ports corresponding to the n processors, respectively, and an internal controller configured to generate and output to the corresponding processor the access information related to whether the at least one of the n processors is accessing or attempts to access the at least one common section, wherein the storage area further comprises c dedicated sections, respectively, allotted to be permitted to be accessed by a predetermined processor of the n processors, c being a natural number, wherein the at least one common section is an area of the storage area that is accessible individually by k processors, k being a natural number and $2=k=n$, during a non-overlapping period of time, and is an area of the storage area for writing or reading operation result values to be communicated between the n processors, wherein the main processor performs a processing operation by accessing a first dedicated section of the c dedicated sections until an operation result value is computed per a processing unit for all operation result values, and writes each computed operation result value in the at least one common section once each operation result value is computed, whereby, during access of the at least one common section by the main processor, the internal controller provides to the n-1 application processors through one interrupt pin, the access information indicating access of the at least one common section by the main processor while the main processor is accessing the at least one common section, and wherein subsequently the n-1 application processors access the at least one common section, read the written operation result values of the at least one common section, maintain the access to the at least one common section until all operation result values written in the at least one common section are read, write the read operation result values in a second dedicated section of the c dedicated sections, and perform an operation corresponding to the processing command received from the main processor, whereby, during access of the at least one common section by the n-1 processors, the internal controller provides to the main processor through another interrupt pin, the access information indicating the access of the at least one common section by the n-1 application processors while the n-1 application processors are accessing the at least one common section.

2. The device of claim 1, wherein at least one of basic data for computing the operation result value per processing unit and an operation intermediate value is written in the first dedicated section.

3. The device of claim 1, wherein the at least one common section is a plurality of common sections, and the number of interrupt pins is identical to that of the plurality of common sections.

4. The device of claim 1, wherein the access information is outputted as a first type signal if another of the n processors is accessing or attempts to access the at least one common section and is outputted as a second type signal if the another of the n processors does not access the at least one common section.

5. The device of claim 4, wherein, while the first type signal is inputted, the another processor which has transmitted an access request to the shared memory re-transmit the access request to the shared memory after the access information, renewed into the second type signal, is inputted.

6. The device of claim 1, wherein each processor inputs an access request including at least one of address information and the control signal into the shared memory in order to access the shared memory.

7. The device of claim 6, wherein the control signal comprises an address signal directed to the at least one common section, and a chip select signal of the shared memory.

8. The device of claim 7, wherein the address signal comprises a bank address pointing to the at least one common section.

9. The device of claim 6, wherein the control signal comprises a mode register set (MRS) signal and a chip select signal of the shared memory.

10. The device of claim 1, wherein the shared memory generates and outputs the access status information by referring to a value written in a predetermined section by one of the n processors, in order that the one of the n processors accesses the at least one common section.

11. A memory device shared by a plurality of processors, the memory device comprising:

n access ports coupled to corresponding n processors, n being a natural number and the same as or larger than 2;

a storage area having at least one common section which is allotted to be accessible individually by k processors, k being a natural number and $2=k=n$, during a non-overlapping period of time, and a plurality of dedicated sections respectively corresponding to the n processors that are allotted to be permitted to be accessed by the n processors; and an internal controller configured to generate and output to the corresponding n processors access information related to whether one processor of the n processors is accessing or attempts to access the at least one common section, wherein the at least one common section is an area for writing or reading operation result values to be communicated between the n processors, wherein the one processor performs a processing operation by accessing a first dedicated section of the plurality of dedicated sections until an operation result value is computed per a processing unit for all operating result values, and writes each computed operation result value in the at least one common section once each operation result value is computed, whereby, during access of the at least one common section by the one processor, the internal controller provides to n-1 processors through one interrupt pin, the access information indicating access of the at least one common section by the one processor while the one processor is accessing the at least one common section, and wherein subsequently the n-1 processors access the at least one common section, read the written operation result values of the at least one common section, maintain the access to the at least one common section until all operation result values written in the at least one common section are read, write the read operation result values in a second dedicated section of the plurality of dedicated sections, and perform an operation corresponding to the processing command received from the one processor, whereby, during access of the at least one common section by the n-1 processors, the internal controller provides to the one processor through another interrupt pin, the access information indicating the access of the at least one common section by the n-1 processors while the n-1 processors are accessing the at least one common section.

12. The device of claim 11, wherein at least one of basic data for computing the operation result value per processing unit and an operation intermediate value is written in the first dedicated section.

13. The device of claim 11, wherein the number of interrupt pins is identical to that of the plurality of common sections.

* * * * *